June 25, 1957  SHIRO FUJITANI  2,797,298
ATTACHMENT FOR COOKING STOVES
Filed May 19, 1955  2 Sheets-Sheet 1
Fig. 1
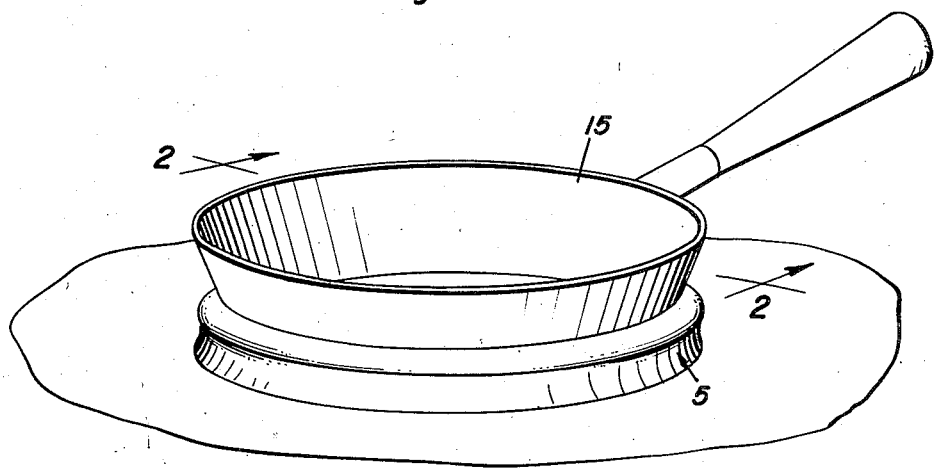
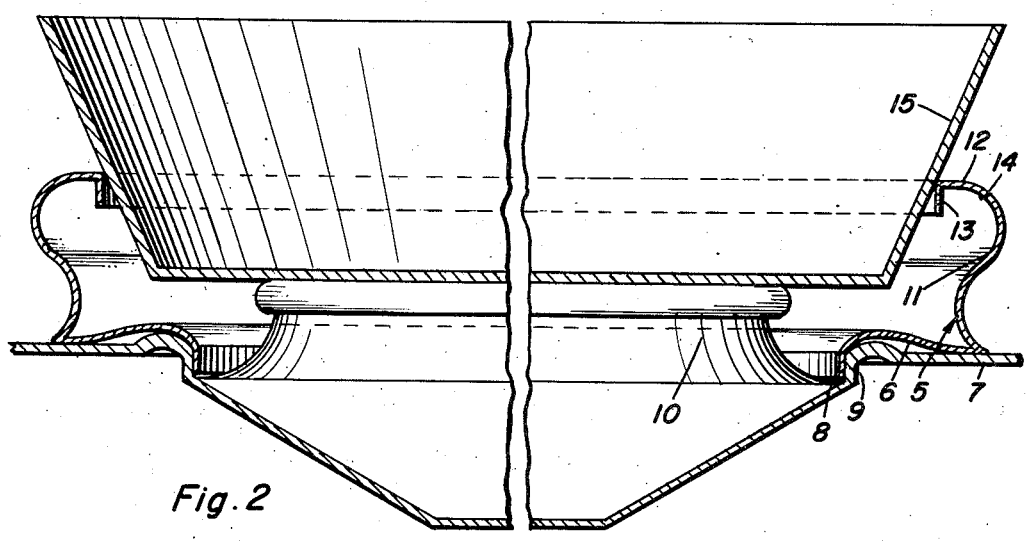
Fig. 2
Shiro Fujitani
INVENTOR.
BY *(signature)*
Attorneys

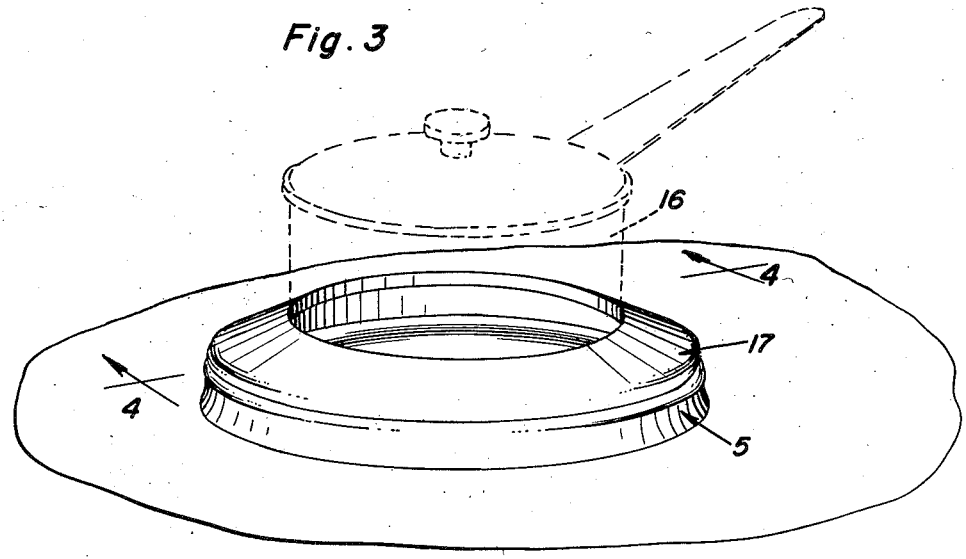
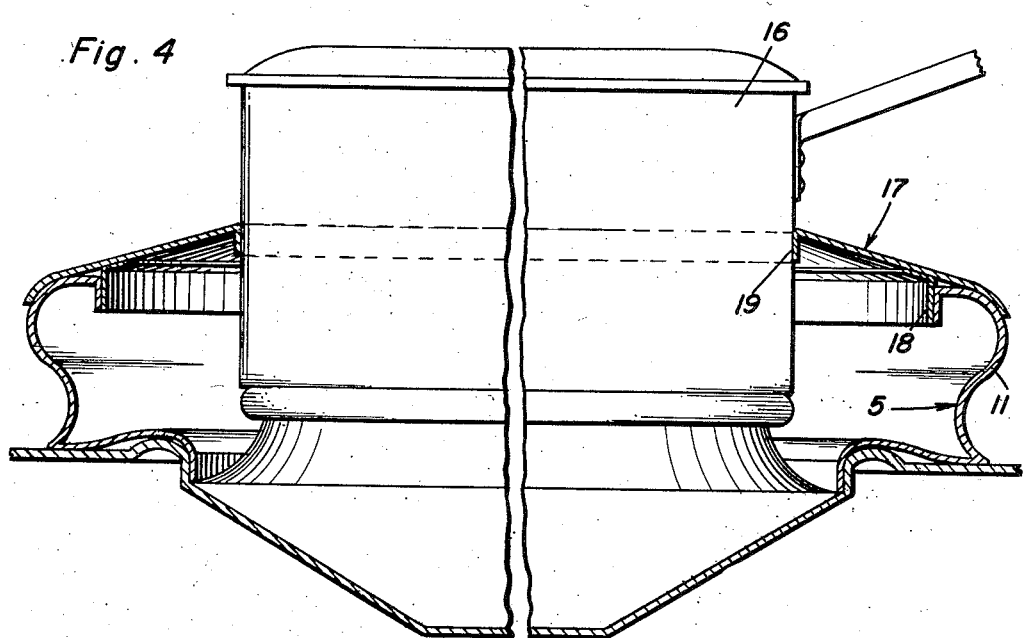

United States Patent Office 2,797,298
Patented June 25, 1957

2,797,298

ATTACHMENT FOR COOKING STOVES

Shiro Fujitani, Wahiawa, Oahu, Territory of Hawaii

Application May 19, 1955, Serial No. 509,578

2 Claims. (Cl. 219—43)

The present invention relates to new and useful improvements in attachments for cooking stoves and more particularly to a heat retaining ring supported on the top of the stove to confine the heat at the bottom and lower side portions of a cooking vessel placed on the heating element or coil of an electric stove.

An important object of invention is to provide a heat retaining attachment of this character which not only serves to confine the heat at the lower portion of the cooking vessel to reduce loss thereof, but also serves to prevent the vessel from being accidentally tipped or upset on the stove.

Another object of invention is to include a removable adapter ring as a part of invention to accommodate cooking vessels of various diameters.

A still further object is to provide a device of this character simple and practical in construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is an enlarged vertical sectional view taken on the line 2—2 of Figure 1;

Figure 3 is a perspective view showing the adapter ring in position; and

Figure 4 is an enlarged vertical sectional view taken on the line 4—4 of Figure 3.

Referring now to the drawings in detail wherein for the purpose of illustration I have disclosed a preferred embodiment of invention, the numeral 5 designates the main heat retaining ring generally and which includes a substantially horizontal annular base member 6 adapted to rest on the top 7 of a cooking stove and is formed with a downwardly projecting internal flange 8 adapted to closely fit in the annular recess 9 in the top of the stove and in which the electric coil or heating element 10 is supported. In conventional types of cooking stoves the coil 10 is supported in the recess 9 above the horizontal plane of the top 7 of the stove, as shown in Figure 2 of the drawings.

An annular wall 11 is integrally formed with or otherwise suitably fixed to the peripheral portion of the base ring 6 and the wall rises upwardly above the top of the stove to a position above the horizontal plane of the coil 10. The upper portion of wall 11 is preferably curved inwardly and bulged outwardly and is formed with an internal downwardly projecting flange 13 to form an inverted channel 14 at the upper portion of the wall 11.

The upper portion of wall 11 and flange 13 is of an internal diameter suitable for placing a frying pan 15 or other cooking vessel therein to rest on the coil 10 and with the flange 13 in substantially close fitting engagement with the side walls of the cooking vessel above the bottom thereof. Accordingly heat from the coil 10 will be trapped in the channel 14 and between the wall 11 and the sides of the cooking vessel to thus retain the heat at the lower side portions of the latter and by so doing the time required for cooking food in the vessel is reduced to result in a saving in consumption of electricity.

In order to accommodate a cooking vessel 16 of smaller diameter an adapter ring designated generally at 17 is provided and which rests on top of the wall 11 and to the underside of which a downwardly projecting flange 18 is welded or otherwise suitably secured for close fitting engagement internally of the downwardly projecting flange 13 of wall 11. The adapter ring 17 is of a width sufficient to project substantially inwardly with respect to wall 11 and is formed at its inner edge with an internal downwardly projecting flange 19 to fit substantially closely against the side of the cooking vessel 16, as shown in Figure 4 of the drawings.

The adapter ring 17 and wall 11 of the main heat retaining ring 5 serves to trap heat from the coil to confine the same at the lower side portion of the cooking vessel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for cooking stove wherein the stove includes an annular recess in its top exposing a heating element, said attachment comprising a heat retaining ring including an annular horizontal base member adapted to rest on the top of the stove and having an internal downwardly projecting flange adapted to enter the recess, a wall rising from the base member and having an inwardly projecting outwardly bulging upper portion, and a downwardly projecting internal flange at the upper portion of the wall forming with said upper portion an inverted heat retaining channel, said wall surrounding the side portion of a cooking vessel placed on the heating element.

2. An attachment for cooking stove wherein the stove includes an annular recess in its top exposing a heating element, said attachment comprising a heat retaining ring including an annular horizontal base member adapted to rest on the top of the stove and having an internal downwardly projecting flange adapted to enter the recess, a wall rising from the base member and having an inwardly projecting outwardly bulging upper portion, and a downwardly projecting internal flange at the upper portion of the wall forming with said upper portion an inverted heat retaining channel, said wall surrounding the side portion of a cooking vessel placed on the heating element, and an adapter ring resting on top of the wall and projecting inwardly thereof, and a downwardly projecting flange at the underside of the adapter ring positioned internally of the internal flange at the upper portion of the wall.

References Cited in the file of this patent

UNITED STATES PATENTS

| 862,719 | Davis | Aug. 6, 1907 |
| 1,131,226 | Frank | Mar. 9, 1915 |

FOREIGN PATENTS

| 95,209 | Switzerland | June 16, 1922 |
| 264,749 | Italy | May 10, 1929 |